United States Patent
Tsukamoto et al.

(10) Patent No.: US 7,536,902 B2
(45) Date of Patent: May 26, 2009

(54) MISFIRE DETECTING APPARATUS FOR INTERNAL COMBUSTION ENGINE

(75) Inventors: Toshinori Tsukamoto, Wako (JP); Mahito Shikama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 11/637,883

(22) Filed: Dec. 13, 2006

(65) Prior Publication Data
US 2007/0157713 A1    Jul. 12, 2007

(30) Foreign Application Priority Data
Dec. 27, 2005    (JP)    ............................... 2005-375023
Sep. 19, 2006    (JP)    ............................... 2006-252210

(51) Int. Cl.
*G01M 15/00*    (2006.01)
(52) U.S. Cl. .................................................. 73/114.04
(58) Field of Classification Search ............. 73/114.02, 73/114.03, 114.04, 114.05, 114.12
See application file for complete search history.

(56) References Cited

U.S. PATENT DOCUMENTS

| | | | | |
|---|---|---|---|---|
| 5,241,480 A | * | 8/1993 | Takaku et al. | ................ 701/111 |
| 5,269,178 A | * | 12/1993 | Vigmostad et al. | ........ 73/114.15 |
| 5,539,644 A | * | 7/1996 | Ichikawa et al. | ............ 701/111 |
| 5,604,303 A | * | 2/1997 | Tomisawa et al. | ........ 73/114.06 |
| 5,758,307 A | * | 5/1998 | Haefner et al. | ............... 701/101 |
| 6,776,032 B2 | * | 8/2004 | Matsui et al. | ............ 73/114.06 |
| 7,292,933 B2 | * | 11/2007 | Christensen | ................ 701/111 |
| 2006/0101902 A1 | * | 5/2006 | Christensen | ................ 73/116 |
| 2007/0137289 A1 | * | 6/2007 | Mathews et al. | ............ 73/118.1 |

FOREIGN PATENT DOCUMENTS

JP    09-119338 A    5/1997

* cited by examiner

*Primary Examiner*—Eric S McCall
(74) *Attorney, Agent, or Firm*—Arent Fox LLP

(57) ABSTRACT

A misfire detecting apparatus for an internal combustion engine wherein a rotational speed parameter according to a rotational speed of the engine is detected. A reference value of the rotational speed parameter is then calculated. Next, a difference between the reference value and a rotational speed parameter detected at every predetermined crank angle as a relative speed parameter is calculated. Further, an integrated value of the relative speed parameter is calculated, and a misfire determination is performed based on the calculated integrated value.

21 Claims, 13 Drawing Sheets

MISFIRE DETECTING APPARATUS FOR INTERNAL COMBUSTION ENGINE

BACKGROUND OF THE INVENTION

1. Field of the Invention

The present invention relates to a misfire detecting apparatus for an internal combustion engine and, particularly, to a misfire detecting apparatus for determining whether a misfire is present based on a rotational speed parameter according to an engine rotational speed.

2. Description of the Related Art

Japanese Patent Laid-open No. H9-119338 discloses a conventional method for determining whether a misfire is present on a featuring signal q(n) that is based on a segment time period, which is a period of time that is required for a rotation of a predetermined crank angle. The featuring signal q(n) is obtained by converting a signal of a segment time period represented as a point on a complex plane, wherein the misfire determination is performed based on an amplitude and a phase of the featuring signal q(n).

In the above-described conventional method, a band pass filter is required for extracting a desired frequency component from the signal indicating the segment time period as a rotational speed parameter. Further, it is necessary to change the filtering characteristic according to a misfire pattern (occurrence mode of misfire, for example, continuing misfire in one cylinder, continuing misfire in two cylinders facing each other, and the like) to be detected. Therefore, the misfire determination process of the conventional method is rather complicated.

Further, in the conventional method, the cylinder in which misfire is occurring may not be accurately identifiable, details of the misfire determination process must be changed depending on the number of cylinders of the engine, and the manpower necessary for setting a determination threshold value is relatively large.

SUMMARY OF THE INVENTION

The present invention was attained for solving the above-described drawbacks in the conventional method as well as others in the related art, and an aspect of the invention is to provide a misfire detecting apparatus which accurately determines a misfire in each cylinder using a comparatively simple calculation and is applicable to numerous different types of engines.

To attain the above-described aspect, the present invention provides a misfire detecting apparatus for an internal combustion engine having rotational speed parameter detecting means for detecting a rotational speed parameter (OMG) corresponding to a rotational speed of the engine and detecting a misfire of the engine. The misfire detecting apparatus includes reference value calculating means, relative speed parameter calculating means, and determining means. The reference value calculating means calculates a reference value (OMGR((k−1)NTDC)) of the rotational speed parameter. The relative speed parameter calculating means calculates a difference between the reference value (OMGR ((k−1)NTDC)) and the rotational speed parameter (OMGR (i)) detected at every predetermined crank angle as a relative speed parameter (OMGREF (i), OMGREFM (i)). The determining means calculates an integrated value (MFJUD) of the relative speed parameter and performs a misfire determination based on the integrated value (MFJUD).

With the above-described structural configuration, the reference value of the rotational speed parameter is calculated, the difference between the reference value and the rotational speed parameter detected at each predetermined crank angle is calculated as the relative speed parameters, and the misfire determination is performed based on the integrated value obtained by integrating the relative speed parameter. The integrated value of the relative speed parameter indicates a generated torque of the cylinder in the combustion stroke by appropriately setting the reference value. Accordingly, it is determined, based on the integrated value, that a misfire has occurred in the cylinder when the generated torque takes a negative value. Since the determination is performed with respect to each cylinder, the cylinder in which a misfire has occurred is easily identified regardless of the number of cylinders of the engine. Consequently, the misfire determination is accurately performed using a comparatively simple calculation, and the misfire detecting apparatus is applicable to numerous different types of engines.

Preferably, the reference value (OMGR((k−1)NTDC)) is a rotational speed parameter detected when a piston of a cylinder of the engine, which is subjected to misfire determination, is proximate a top dead center from which a combustion stroke starts.

With the above-described structural configuration, the reference value is set to the rotational speed parameter detected when the piston of the cylinder, which is subjected to the misfire determination, is proximate a top dead center from which the combustion stroke starts. As such, the misfire determination is performed based on changes in the rotational speed parameter detected during the combustion stroke of the subject cylinder.

Preferably, the determining means integrates the relative speed parameter (OMGREF (i), OMGREFM (i)) for a period of 720/N degrees of the crank angle, where "N" is a number of cylinders of the engine.

The period of 720/N degrees of the crank angle during which the integration is performed is set, for example, to a period of 720/N degrees starting from a crank angle proximate the top dead center at which the combustion stroke of the cylinder starts (the compression top dead center), i.e., a period that contains a crank angle position at which the generated torque becomes maximum in the combustion stroke of the cylinder (the cylinder subjected to the determination) and is hardly influenced by combustion of other cylinders.

With the above-described structural configuration, the integrated value is calculated by integrating the relative speed parameter during the period of 720/N degrees of the crank angle ("N" is the number of cylinders of the engine). The period of 720/N degrees corresponds to a period of the crank angle corresponding to the combustion stroke of any one cylinder of "N" cylinders. By performing the integration with respect to the period of 720/N degrees, the misfire determination corresponding to each cylinder is accurately performed.

Preferably, the misfire detecting apparatus further includes inertial force rotational speed component calculating means for calculating an inertial force rotational speed component (OMGI) due to an inertial force of moving parts of the engine. The determining means determines the misfire based on the relative speed parameters (OMGREF(i), OMGREFM(i)) and the inertial force rotational speed component (OMGI).

With the above-described structural configuration, the misfire determination is performed based on the relative speed parameter and the inertial force rotational speed component due to the inertial force of the moving parts of the engine. By eliminating the influence of the rotational speed component due to the inertial force of the moving parts of the engine, accurate misfire determination is performed.

Preferably, the misfire detecting apparatus further includes inertial force rotational speed component calculating means for calculating an inertial force rotational speed component (OMGIa) due to an inertial force of moving parts of the engine. The determining means modifies the relative speed parameter (OMGREF) with the inertial force rotational speed component (OMGIa) to calculate a first modified relative speed parameter (OMGREFMa); multiplies the first modified relative parameter (OMGREFMa) by a combustion correlation function (FCR), which approximates changes in the rotational speed of the engine corresponding to a normal combustion, to calculate a second modified relative speed parameter (OMGREFMb); and performs the misfire determination based on an integrated value (MFJUDd) of the second modified relative speed parameter.

With the above-described structural configuration, the first modified relative speed parameter is calculated by modifying the relative speed parameter with the inertial force rotational speed component. The second modified relative speed parameter is calculated by multiplying the first modified relative parameter by the combustion correlation function which approximates changes in the engine rotational speed corresponding to normal combustion. The misfire determination is performed based on the integrated value of the second modified relative speed parameter. By multiplying the combustion correlation function, any influence from disturbances contained in the detected rotational speed parameter is eliminated, wherein accuracy of the misfire determination is improved.

Preferably, the combustion correlation function (FCR) is defined by the following equation:

$$(1-\cos(N \cdot \theta/2))/2$$

where "N" is a number of cylinders of the engine, and "θ" is a crank angle defined on the basis of a crank angle at which a piston in a specific cylinder of the engine is positioned at top dead center.

With the above-described structural configuration, the combustion correlation function defined by the above-defined equation is applied. Therefore, appropriate correction is performed using a comparatively simple calculation, regardless of the number of cylinders of the engine.

Preferably, the combustion correlation function (FCR) is defined by normalizing a waveform of the change in the rotational speed of the engine corresponding to normal combustion so that the minimum value of the waveform is equal to "0" and the maximum value of the waveform is equal to "1".

With the above-described structural configuration, the above-defined combustion correlation function is applied. Therefore, the combustion correlation function reflects the characteristic of the engine, wherein the correction is more appropriately performed.

Preferably, the misfire detecting apparatus further includes load torque correcting means. The load torque correcting means corrects the rotational speed parameter (OMG (i)) to eliminate a rotational speed changing component due to a load torque applied to the engine from a load on the engine. The reference value calculating means and relative speed parameter calculating means, respectively, calculate the reference value and the relative rotational speed parameter using the rotational speed parameter (OMGR (i)) corrected by the load torque correcting means.

The "load torque applied to the engine from a load on the engine" is defined by the torque applied to the engine from the wheels of the vehicle, auxiliary components driven by the engine, and/or friction of the various engine parts, or the like.

With the above-described structural configuration, the rotational speed parameter is corrected to eliminate the rotational speed changing component due to the torque applied from the load on the engine. The reference value and the relative speed parameter are calculated using the corrected rotational speed parameter. Therefore, accurate misfire determination is performed by eliminating the influence of the rotational speed changing component due to the load torque applied to the engine.

DETAILED DESCRIPTION OF THE PREFERRED EMBODIMENTS

Preferred embodiments of the present invention will now be described with reference to the drawings.

First Embodiment

Figure 1:
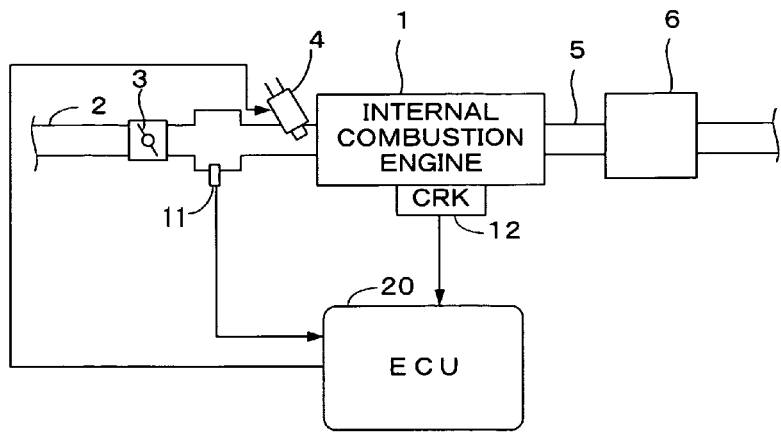
FIG. 1 is a schematic diagram showing an internal combustion engine and a control system therefor according to one embodiment of the present invention.

FIG. 1 is a schematic diagram showing an internal combustion engine and a control system therefor according to one embodiment of the present invention. The internal combustion engine 1 (hereinafter referred to as "engine") includes a plurality of, e.g., six, cylinders; an intake pipe 2; and an exhaust pipe 5. The intake pipe 2 is provided with a throttle valve 3. The exhaust pipe 5 is provided with a catalytic converter 6 for purifying exhaust gases.

A fuel injection valve 4 is provided for each cylinder at a position slightly upstream of an intake valve (not shown) in the intake pipe 2 and between the engine 1 and the throttle valves 3. Each fuel injection valve 4 is connected to a fuel pump (not shown) and electrically connected to an electronic control unit 20 (hereinafter referred to as "ECU 20"). A valve opening period of the fuel injection valve 4 is controlled by a control signal from the ECU 20.

An absolute intake pressure (PBA) sensor 11 is provided immediately downstream of the throttle valve 3. The PBA sensor 11 detects a pressure in the intake pipe 2 and the detection signal is supplied to the ECU 20.

A crank angle position sensor 12 for detecting a rotational angle of the crankshaft (not shown) of the engine 1 is connected to the ECU 20. A signal of the detected rotational angle of the crankshaft is supplied to the ECU 20. The crank angle position sensor 12 includes a cylinder discrimination sensor which outputs a pulse (hereinafter referred to as "CYL pulse") at a predetermined angle position of a specific cylinder of the engine 1. The crank angle position sensor also includes a top dead center (TDC) sensor which outputs a TDC pulse at a crank angle position before a TDC of a predetermined crank angle starts at an intake stroke in each cylinder (i.e., at every 120-degree crank angle in the case of a 6-cylinder engine) and a crank angle (CRK) sensor for generating one pulse (hereinafter referred to as "CRK pulse") with a crank angle period (e.g., period of 6 degrees, shorter than the period of generation of the TDC pulse). The CYL pulse, the TDC pulse and the CRK pulse are supplied to the ECU 20. The CYL, TDC, and CRK pulses are used to control the various timings, such as a fuel injection timing and an ignition timing, as well as to detect an engine rotational speed NE. Further, the ECU 20 detects a misfire has occurred in the engine 1 based on a time period needed to generate the CRK pulse (hereinafter referred to as "time period parameter") CRME.

The ECU 20 includes an input circuit, a central processing unit (hereinafter referred to as "CPU"), a memory circuit, and an output circuit. The input circuit performs numerous functions, including: shaping the waveforms of input signals from the various sensors; correcting the voltage levels of the input signals to a predetermined level; and converting analog signal values to digital signal values. The memory circuit preliminarily stores various operating programs to be executed by the CPU and stores results of computations, or the like, by the CPU. The output circuit supplies control signals to the fuel injection valve 4, and the like. The CPU in the ECU 20 performs the misfire detection described below.

The method of the misfire detection according to the embodiment is described in detail below.

Figure 2A:
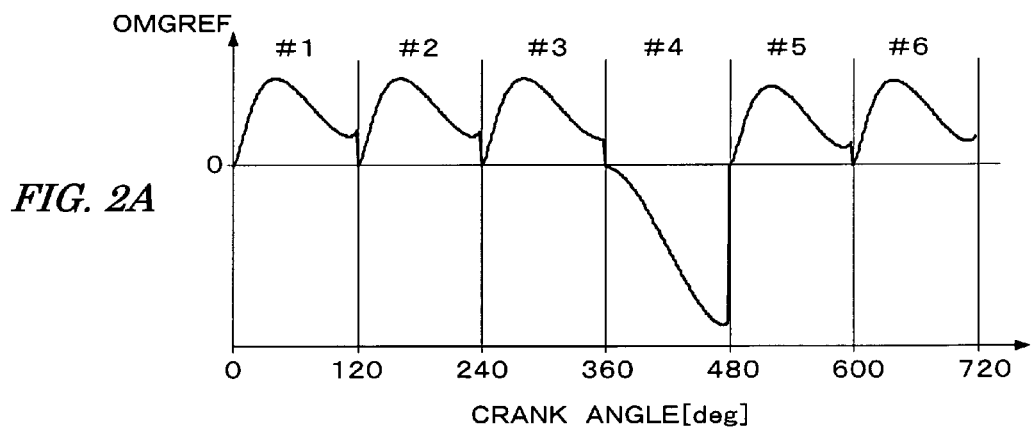
FIGS. 2A and 2B are diagrams showing a method of misfire determination.

FIG. 2A is a time chart showing changes in a relative rotational speed OMGREF with reference to a rotational speed (hereinafter referred to as "reference rotational speed") detected at the time a piston of each cylinder is positioned proximate a compression TDC of each cylinder of the engine 1. The compression TDC is defined as a TDC from which the combustion stroke of each cylinder starts. In the following explanation, the description of "at the compression TDC of each cylinder" or "proximate the compression TDC of each cylinder" means "at the time the piston of each cylinder is positioned at the compression TDC" or "at the time the piston of each cylinder is positioned proximate the compression TDC".

The relative rotational speed OMGREF is calculated by subtracting the reference rotational speed from a rotational speed detected at every six degrees of the crank angle (calculated from the time period parameter CRME). #1 to #6 in FIG. 2A are cylinder discrimination numbers (which are different from cylinder numbers described below) for discriminating the six cylinders which are numbered in the order of ignition. In the combustion stroke after the compression TDC, if ignition is performed normally, the relative rotational speed OMGREF takes a positive value. But, if a misfire occurs, the relative rotational speed OMGREF takes a negative value. That is, in the example shown in FIG. 2A, normal combustion is performed in cylinders #1 to #3, #5, and #6, and a misfire has occurred in cylinder #4. Therefore, an integrated value obtained by integrating the relative rotational speed OMGREF, calculated at every six degrees of the crank angle during the 1 TDC period (period of 120 degrees of the crank angle corresponding to the combustion stroke), takes a negative value for cylinder #4 where a misfire has occurred, and takes a positive value for the cylinder where normal combustion is performed, as indicated by bar graphs (bar graphs on the right side with no hatching) of FIG. 2B. Accordingly, the cylinder, where a misfire has occurred, is easily determined. The integrated value obtained by the above-described calculation is a parameter indicative of a torque generated by each cylinder.

Figure 2B:
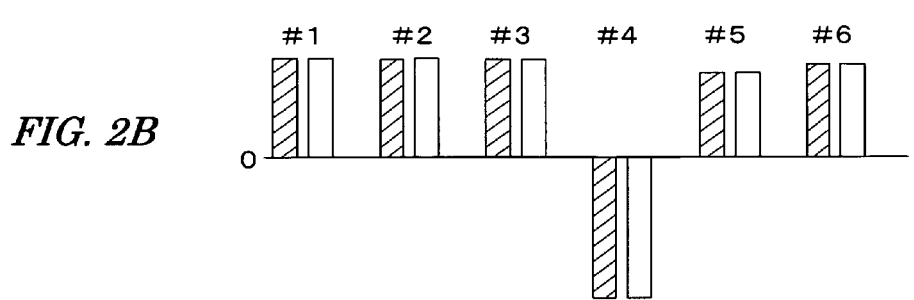

The bar graphs with hatching in FIG. 2B show an integrated value obtained by integrating a relative time period parameter CRMEREF with reference to a time period parameter (hereinafter referred to as "reference time period parameter") detected proximate the compression TDC for one TDC period. The relative time period parameter CRMEREF is calculated by subtracting a time period parameter detected at every six degrees of the crank angle from the reference time period parameter. That is, the relative time period parameter CRMEREF takes a positive value if the torque is generated by combustion, but takes a negative value if the torque is not generated due to a misfire. Therefore, the relative time period parameter CRMEREF takes a negative value for cylinder #4 where a misfire has occurred and takes a positive value for the cylinders where normal combustion is performed, similar to the integrated value of the relative rotational speed OMGREF. Therefore, it is possible to similarly perform misfire determination using the time period parameter CRME without converting the time period parameter CRME to the rotational speed OMG.

Figure 3A:
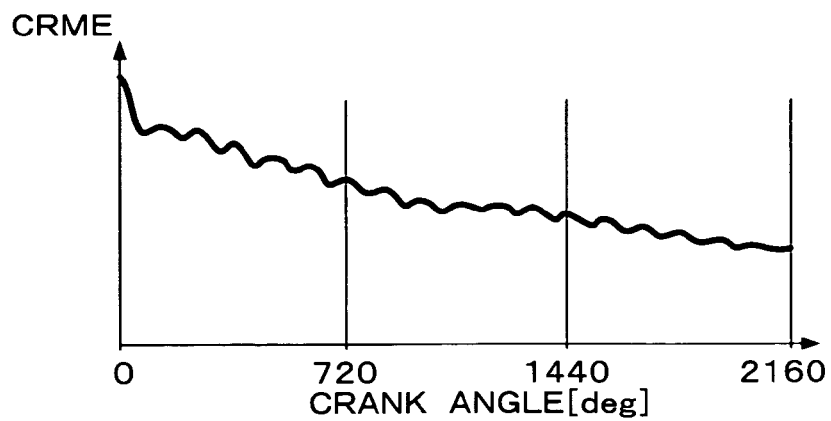
FIGS. 3A-3C are time charts showing changes in parameters calculated for the misfire determination method.
Figure 3B:
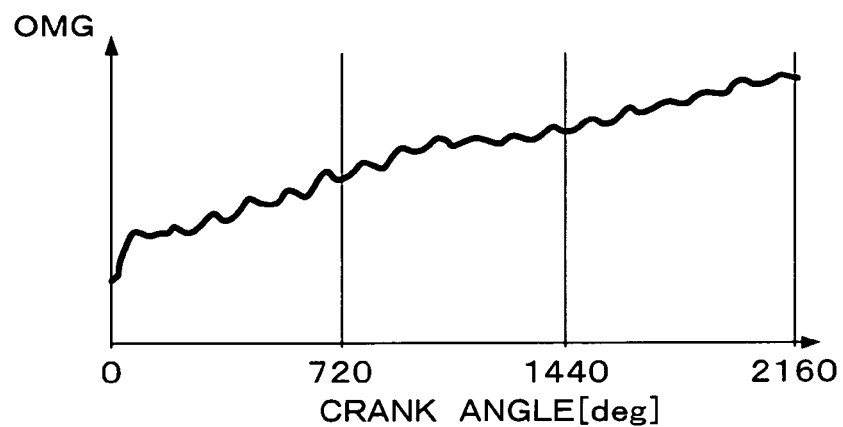
Figure 3C:
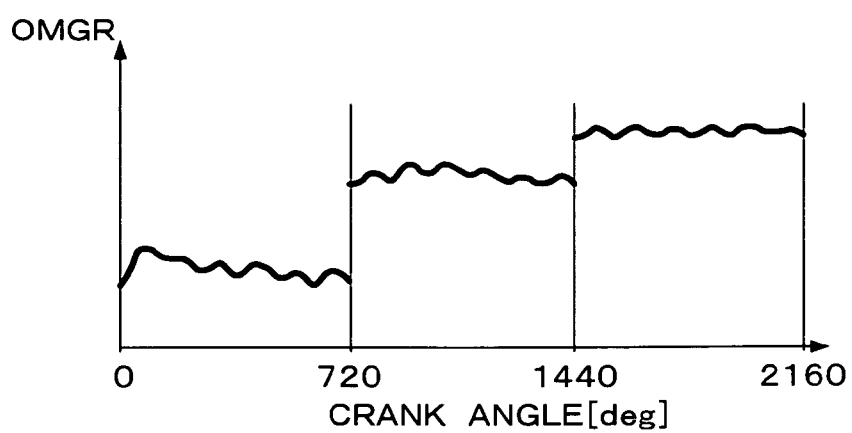

FIGS. 3A-3C and 4A-4C are time charts used for explaining the above-described misfire determination method. FIGS. 3A-3C and 4A-4B show an example where the engine rotational speed NE gradually rises. FIG. 3A shows changes in the time period parameter CRME, and FIG. 3B shows changes in the rotational speed OMG calculated from the time period parameter CRME. FIG. 3C shows changes in a filtered rotational speed OMGR calculated by performing a 720-degree filtering on the rotational speed OMG. The 720-degree filtering is defined as extracting a changing component over a comparatively short period by canceling a linearly changing component in one combustion cycle period (the details of this filtering will be described later). The 720-degree filtering is performed to eliminate a rotational speed changing component due to a torque applied to the engine from a load on the engine (a torque applied from wheels of the vehicle and auxiliary components driven by the engine 1, a torque due to the friction of the sliding parts of the engine 1, or the like).

Figure 4A:
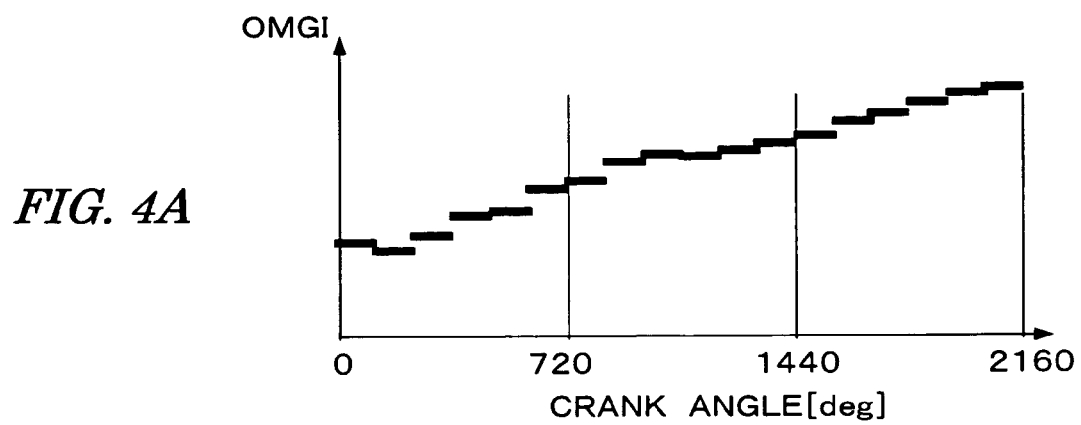
FIGS. 4A-4C are time charts showing changes in parameters calculated for the misfire determination method.

FIG. 4A shows changes in an inertial force rotational speed OMGI calculated at the same time the reference rotational speed in the vicinity of the compression TDC of each cylinder is calculated. The inertial force rotational speed OMGI is calculated according to a total mass of reciprocating parts (pistons and connecting rods) of the engine 1, a length of the connecting rod, a crank radius, and an inertia moment due to rotating parts driven by the engine 1, such as a crank pulley, a torque converter, and a lockup clutch.

Figure 4B:
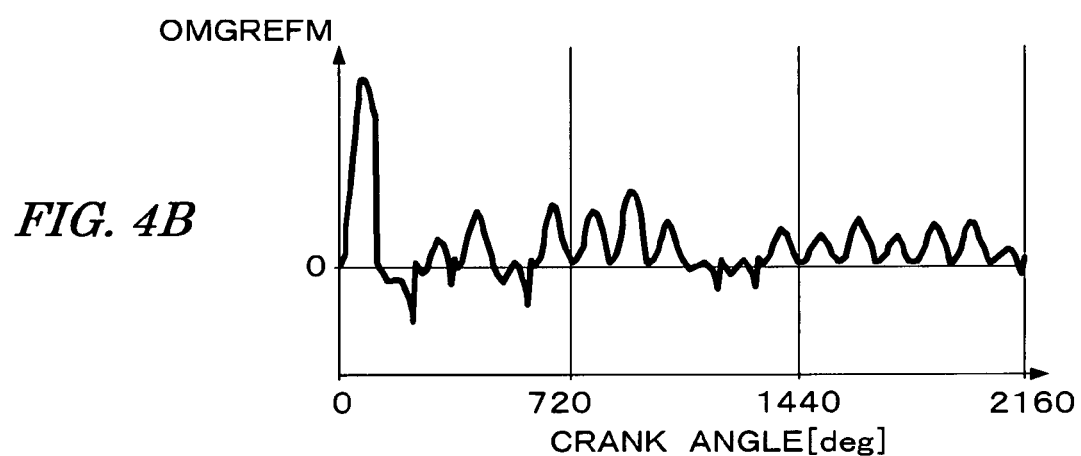
Figure 4C:
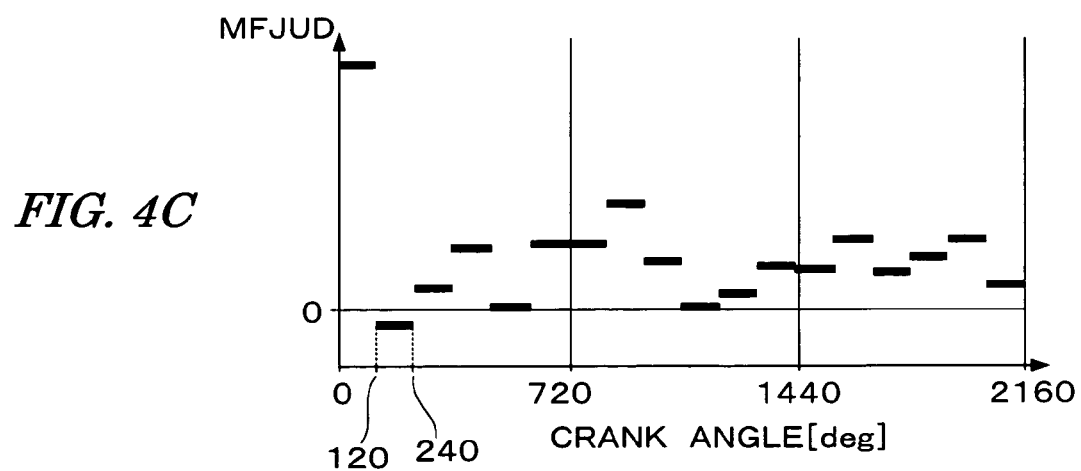

FIG. 4B shows changes in a modified relative rotational speed OMGREFM (=OMGREF+OMGI) calculated by adding the inertial force rotational speed OMGI to the relative rotational speed OMGREF. FIG. 4C shows changes in a determination parameter MFJUD which is an integrated value calculated by integrating the modified relative rotational speed OMGREFM for one TDC period. In this example, the determination parameter MFJUD takes a negative value corresponding to a range of 120 to 240 degrees of the crank angle, and it is determined that a misfire has occurred in cylinder #2.

Next, a method for calculating the inertial force rotational speed OMGI is described below. A torque by inertial forces generated in one cylinder (hereinafter referred to as "single cylinder inertia torque TI1") is given by equation (1), where a length of the connecting rod is "L", a crank radius is "R", an offset is "e", a rotational angular speed of the crankshaft is "$\omega$", a total mass of a piston and a connecting rod is "m", and angles "$\theta$" and "$\phi$" are respectively defined as illustrated. In the equations described below, the angle unit is "radian [rad]".

$$TI1 = -mR^2\omega^2(\cos\theta + e\sin\theta/L + R\cos2\theta/L) \cdot \cos\left\{\frac{\pi}{2} - (\phi + \theta)\right\}/\cos\phi \quad (1)$$

Figure 6A:
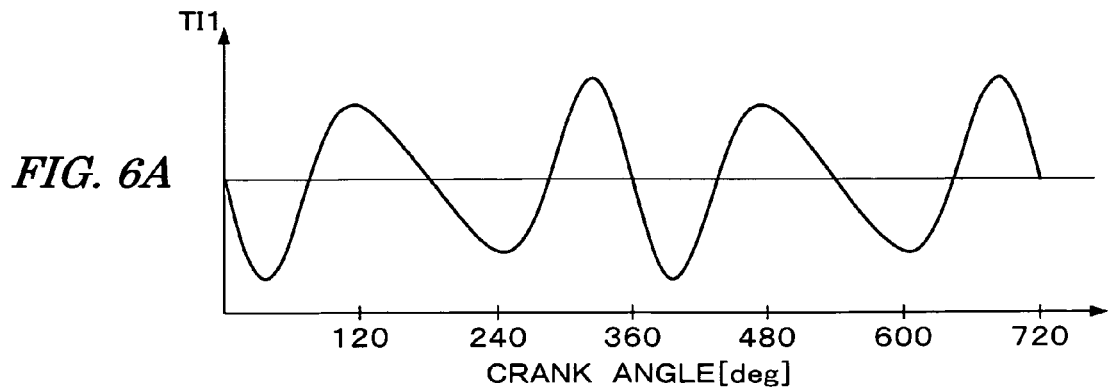
FIGS. 6A-6C are graphs showing waveforms that indicate a relationship between the inertial force torque per one cylinder (TI1), the combined inertia torque (TI) of six cylinders, and the inertial force rotational speed (ωI)
Figure 6B:
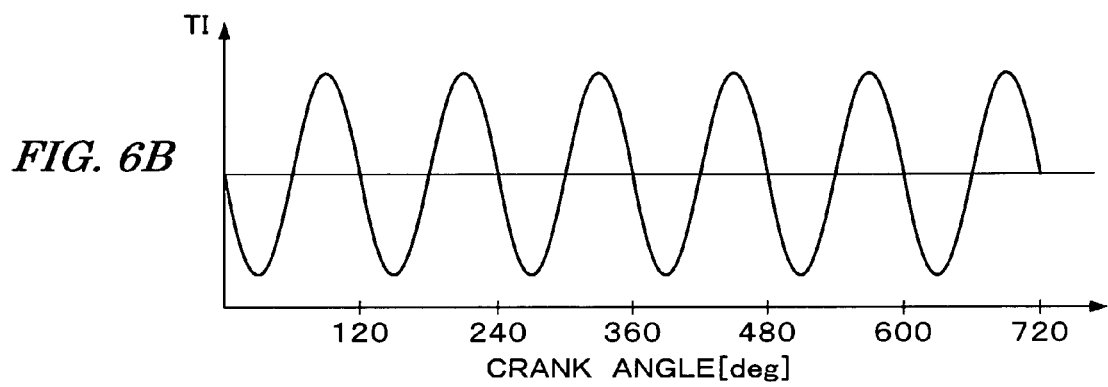

FIG. 6A shows a graph of the single cylinder inertia torque TI1 calculated by equation (1) as a function of the crank angle $\theta$. A combined inertia torque TI is obtained by adding six single cylinder inertia torques TI1 with 120-degree phase shift changes as shown in FIG. 6B. The combined inertia torque TI is approximated by equation (2).

$$TI = -A \sin 3\theta \quad (2)$$

where "A" is a coefficient proportional to the square of the rotational angular speed $\omega$ [rad/s].

Figure 6C:
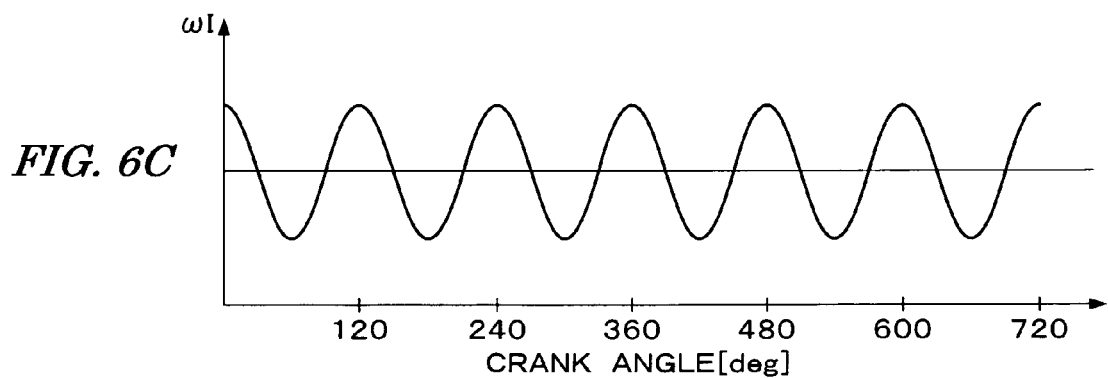

On the other hand, if the inertia moment of rotating parts, such as a crank pulley and a torque converter, is expressed by "I", the combined inertia torque TI is given by equation (3) (refer to FIG. 6C).

$$TI = I \times (d\omega/dt) \quad (3)$$

Equation (4) is obtained from equations (2) and (3). If equation (4) is solved for the rotational angular speed $\omega$, the inertial force rotational speed $\omega I$. corresponding to the combined inertia torque TI, is given by equation (5)

$$A \sin 3\theta = I \times (d\omega/dt) \quad (4)$$

$$\omega I = (A \cos 3\theta \times dt/d\theta)/3I \quad (5)$$

Therefore, the inertial force rotational speed OMGI at the compression TDC is calculated by equation (6) which is obtained by applying "0" to $\theta$ of equation (5)

$$OMGI = (A/3I)(1/OMG) \quad (6)$$

Since the coefficient A is proportional to the square of the rotational speed OMG, equation (6) is transformed to equation (7) where "K" is a proportionality constant.

$$OMGI = K \times OMG/3I \quad (7)$$

FIG. 6B shows changes in the combined inertia torque TI, and FIG. 6C shows changes in the inertial force rotational speed $\omega I$ corresponding to the combined inertia torque TI. As shown in FIG. 6C, the inertial force rotational speed OMGI takes a maximum value at the compression TDC ($\theta$=0, 120, 240, . . . ). Accordingly, a modified relative rotational speed OMGREFM is obtained by adding the inertial force rotational speed OMGI to the relative rotational speed OMGREF (equivalent to subtracting the inertial force rotational speed OMGI from the reference rotational speed) to eliminate the influence of the inertial force rotational speed $\omega I$. The periodic changing component of the inertial force rotational speed $\omega I$ shown in FIG. 6C is canceled by integrating the modified relative rotational speed OMGREFM for one TDC period (120 degrees).

Figure 7:
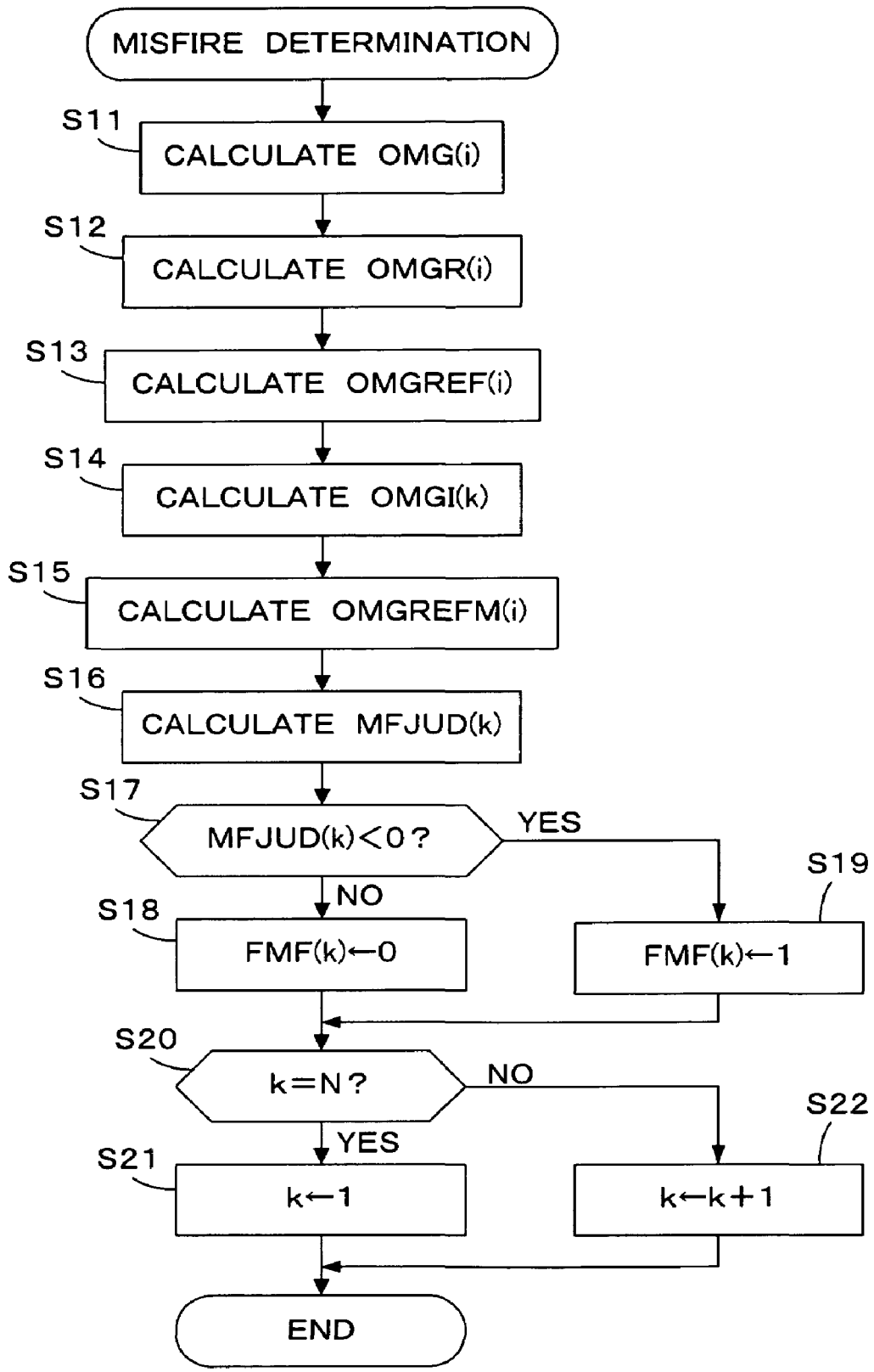
FIG. 7 is a flowchart of a misfire determination process according to the first embodiment of the present invention.

FIG. 7 is a flowchart of a misfire determination process which is executed by the CPU in the ECU 20 in synchronism with generation of the TDC pulse. The time period parameter CRME (i), which is a time interval of generation of the CRK pulse generated at every six degrees of the crank angle, is detected. The data of the time period parameter CRME (i) corresponding to an angular range for 720 degrees of the crank angle (i=0–(ND–1) and the data number (ND is "120") are stored in a buffer memory in the memory circuit. Further, when a cylinder discrimination number, which is numbered in the order of ignition, is expressed by "k" (=1 to 6), and a number of data corresponding to one TDC period is expressed by "NTDC" (NTDC=20 in this embodiment), calculations in which the parameter "i" takes values from (k–1)NTDC to (kNTDC–1) are performed by one execution of the process. For example, when the process performs the calculations corresponding to the first cylinder (k=1), the parameter "i" takes values from "0" to (NTDC–1), and when the process performs the calculations corresponding to the fifth cylinder (k=5), the parameter "i" takes values from 4NTDC to (5NTDC–1).

In step S11, the time period parameter CRME(i) is converted to a rotational speed OMG(i) [rad/s] by equation (8).

$$OMG(i) = D\theta/CRME(i) \quad (8)$$

where D$\theta$ is an angular interval $4\pi$/ND of measuring the time period parameter CRME, which is set to $\pi$/30 [rad] in this embodiment.

In step S12, the 720-degree filtering is performed to calculate the filtered rotational speed OMGR(i) by equation (9).

$$OMGR(i) = OMG(i) - (OMG(ND) - OMG(0)) \times D\theta \times i/4\pi \quad (9)$$

In step S13, the relative rotational speed OMGREF is calculated by equation (10).

$$OMGREF(i) = OMGR(i) - OMGR((k-1)NTDC) \quad (10)$$

where OMGR((k–1)NTDC) is the reference rotational speed which corresponds to the filtered rotational speed at the compression TDC of the cylinder subjected to the determination process.

In step S14, the inertial force rotational speed OMGI(k) is calculated by equation (11).

$$OMGI(k) = K \times OMG((k-1)NTDC)/3I \quad (11)$$

In addition, it is preferable to change the value of the inertia moment I based on whether the lockup clutch of the automatic transmission is engaged or not. Thereby, the determination is accurately performed regardless of whether the lockup clutch is engaged.

In step S15, the modified relative rotational speed OMGREFM(i) is calculated by equation (12).

$$OMGREFM(i) = OMGREF(i) + OMGI(k) \quad (12)$$

In step S16, the determination parameter MFJUD(k) is calculated as an integrated value of the modified relative rotational speed OMGREFM by equation (13).

$$MFJUD(k) = \sum_{i=(k-1)NTDC}^{kNTDC-1} OMGREFM(i) \quad (13)$$

In step S17, it is determined whether the determination parameter MFJUD (k) is less than "0". If the answer to step S17 is negative (NO), it is determined that a normal combustion is performed, and a misfire flag FMF(k) is set to "0" (step S18). On the other hand, if MFJUD(k) is less than "0", it is determined that a misfire has occurred in cylinder #k, and the misfire flag FMF(k) is set to "1" (step S19).

In step S20, it is determined whether the cylinder discrimination number k is equal to the number N of cylinders. If the answer to step S20 is negative (NO), the cylinder discrimination number k is incremented by "1" (step S22). If the cylinder discrimination number k is equal to the number N of cylinders, the cylinder discrimination number k is returned to "1" (step S21).

The misfire determination is performed for each cylinder by the process shown in FIG. 7.

Figure 8:
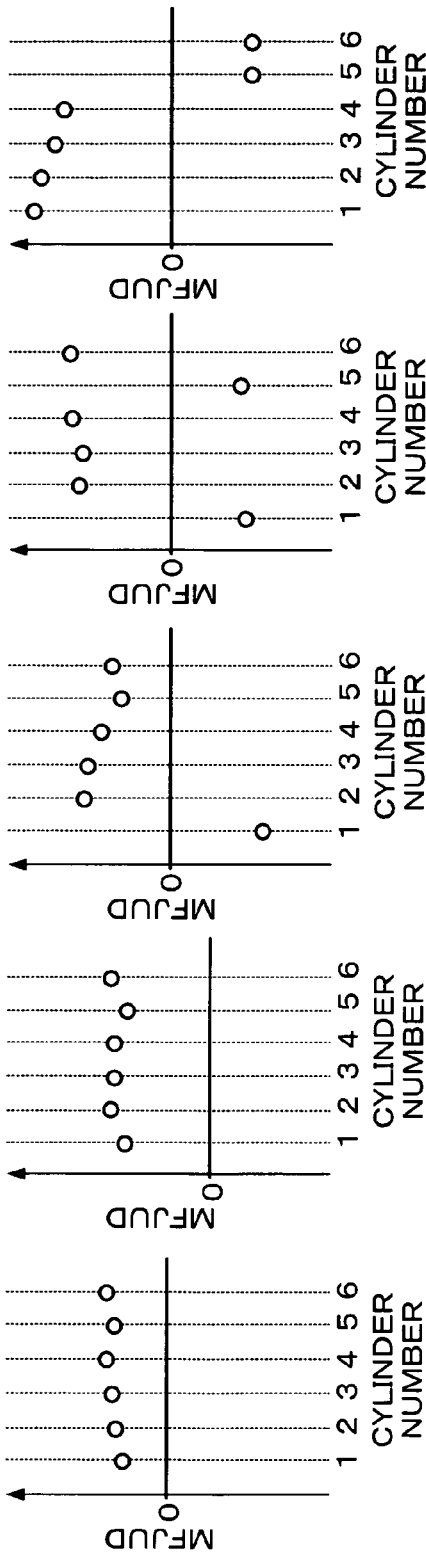
FIGS. 8A-8J show examples of the misfire determination results.

FIGS. 8A-8J show the calculated results of the determination parameter MFJUD when changing a misfire occurring pattern in various engine operating conditions. FIG. 8A shows the calculated data of an example wherein normal combustion is performed in an operating condition of a low rotational speed and a low load. FIG. 8B shows the calculated data of an example wherein normal combustion is performed in an operating condition of a low rotational speed and a high load. The positive values are obtained with respect to all cylinders.

FIG. 8C shows an example wherein a misfire occurs in cylinder No. 1 in an operating condition of a low rotational speed and a low load. FIG. 8D shows an example wherein misfires occur in cylinder No. 1 and cylinder No. 5 in an operating condition of a low rotational speed and a low load. FIG. 8E shows an example wherein misfires occur in cylinder No. 5 and cylinder No. 6 in an operating condition of a low rotational speed and a partial load. In any example, the determination parameter MFJUD, corresponding to the cylinder in which a misfire occurs, takes a negative value, indicating that the misfire is accurately determined.

FIG. 8F shows an example wherein misfires occur in cylinder No. 1 and cylinder No. 5 in an operating condition of a high rotational speed and a low load. FIG. 8G shows an example wherein a misfire occurs in cylinder No. 5 in an operating condition of a high rotational speed and a full load. FIG. 8H shows an example wherein misfires occur in cylinder No. 3 and cylinder No. 4 in an operating condition of a high rotational speed and a partial load. FIG. 8I shows an example wherein a misfire occurs in cylinder No. 5 in an operating condition of a high rotational speed and a low load. FIG. 8J shows an example wherein misfires occur in cylinder No. 1, cylinder No. 3, and cylinder No. 4 in an operating condition of a medium rotational speed and a partial load. In any example, the determination parameter MFJUD, corresponding to the cylinder in which a misfire occurs, takes a negative value, indicating that the misfire is accurately determined.

As described above, in this embodiment, the relative rotational speed, whose reference rotational speed is a rotational speed at the compression TDC of each cylinder, is integrated for one TDC period to calculate the determination parameter MFJUD indicative of a torque generated by the cylinder during the combustion stroke, wherein the misfire determination is performed based on the determination parameter MFJUD.

In addition, it is not necessary to perform a plurality of filtering processes corresponding to various misfire occurring patterns to be detected. Therefore, the misfire determination is accurately performed with respect to each cylinder using a relatively simple calculation.

Specifically, the relative rotational speed OMGREF is calculated as a difference between the reference rotational speed OMGR((k−1)NTDC) detected in the vicinity of the compression TDC of the cylinder being subjected to the misfire determination, the rotational speed OMGR is calculated at every six degrees of the crank angle, and the modified relative rotational speed OMGREFM is calculated by adding the inertial force rotational speed OMGI to the relative rotational speed OMGRFF. By adding the inertial force rotational speed OMGI, a deviation of the reference rotational speed OMGR ((k−1)NTDC), due to the inertial force rotational speed, is corrected to eliminate the influence of the inertial force rotational speed, thereby making it possible to accurately perform the misfire determination.

The inertial force rotational speed OMGI, due to the inertial force, is calculated from the data clearly given by designing, such as a size, a mass, and the like, of the engine parts. Therefore, the manpower necessary for setting determination threshold values, and the like, is significantly reduced.

Further, the filtered rotational speed OMGR is calculated by performing the 720-degree filtering on the rotational speed OMG. The relative rotational speed OMGREF, the modified relative rotational speed OMGREFM, and the determination parameter MFJUD are calculated using the filtered rotational speed OMGR. According to the 720-degree filtering, the rotational speed changing component, due to the torque applied from the load on the engine 1 (for example, the torque applied from wheels of the vehicle and auxiliary components driven by the engine 1, or the torque caused by friction of the sliding parts of the engine 1), is eliminated, thereby making it possible to accurately perform the misfire determination.

In this embodiment, the crank angle position sensor 12 and the ECU 20 constitute the rotational speed parameter detecting means. The ECU 20 constitutes the reference value calculating means, the relative speed parameter calculating means, the determining means, the inertial force speed component calculating means, and the load torque correcting means. Specifically, step S11 of FIG. 7 corresponds to a part of the rotational speed parameter detecting means, step S13 corresponds to the reference value calculating means and the relative speed parameter calculating means, steps S15-S19 correspond to the determining means, step S14 corresponds to the inertial force speed component calculating means, and step S12 corresponds to the load torque correcting means.

Modification

Figure 9:
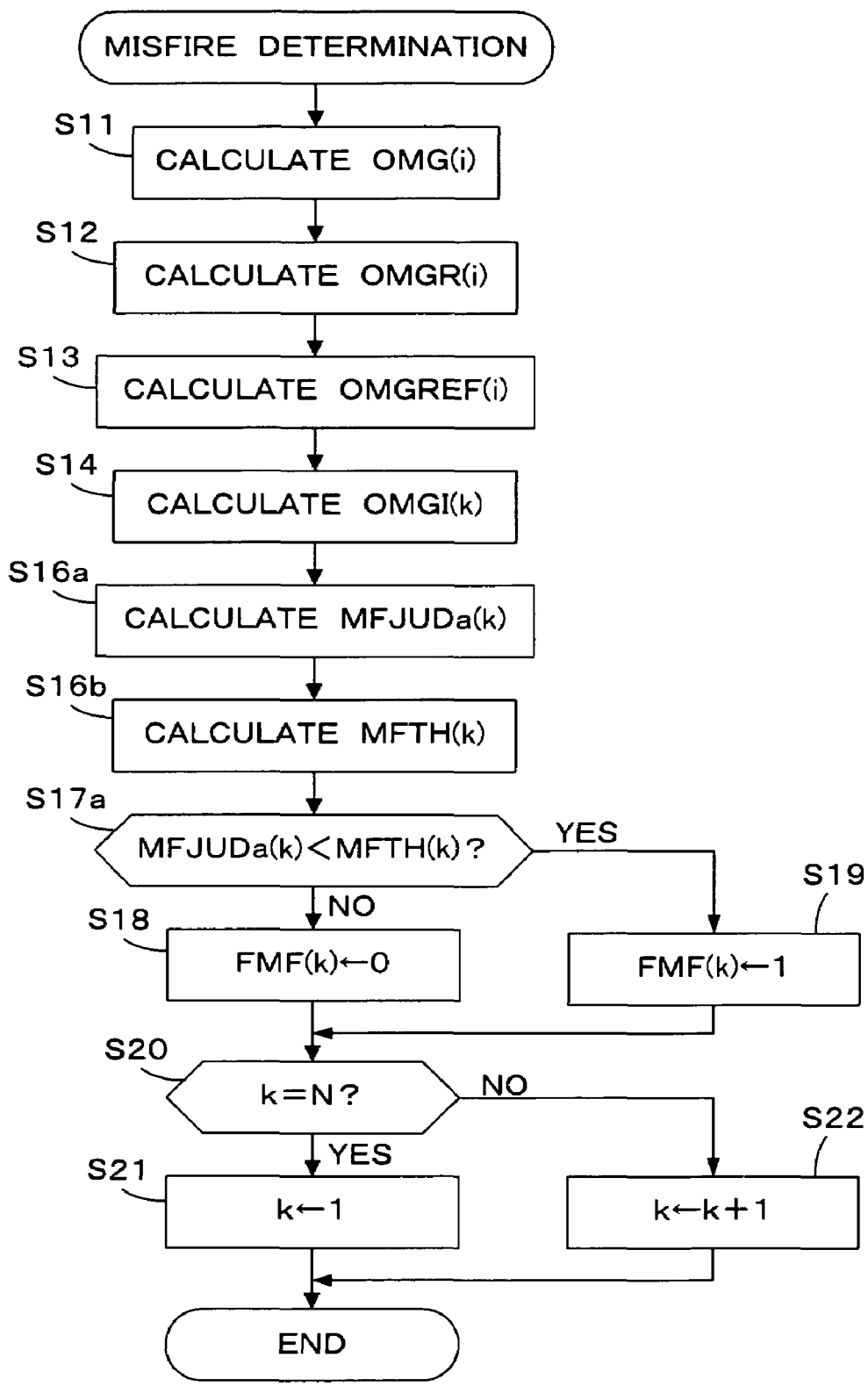
FIG. 9 is a flowchart of a misfire determination process according to a modification of the first embodiment of the present invention.

FIG. 9 shows a modification of the embodiment shown in FIG. 7. The process shown in FIG. 9 is obtained by changing steps S16 and S17 of the process shown in FIG. 7 to steps S16a, S16b, and S17a.

In step S16a, the determination parameter MFJUDa(k) is calculated as an integrated value of the relative rotational speed OMGREF(i) by equation (13a).

$$MFJUDa(k) = \sum_{i=(k-1)NTDC}^{kNTDC-1} OMGREF(i) \quad (13a)$$

In step S16b, a determination threshold value MFTH(k) is calculated by equation (14).

$$MFTH(k) = -NTDC \times OMGI(k) \quad (14)$$

In step S17a, it is determined whether the determination parameter MFJUDa(k) is less than the determination threshold value MFTH(k). If the answer to step S17a is negative (NO), it is determined that normal combustion is performed and the process proceeds to step S18. On the other hand, if MFJUDa(k) is less than MFTH(k), it is determined that a misfire has occurred in cylinder #k, and the process proceeds to step S19.

In the modification of the first embodiment, the determination threshold value MFTH(k) corresponds to an integrated value of the inertial force rotational speed OMGI. That is, the determination parameter MFJUDa(k) is calculated by integrating the relative rotational speed OMGREF instead of integrating the modified relative rotational speed OMGREFM, and the determination threshold value MFTH(k) is calculated as the integrated value of the inertial force rotational speed OMGI. Accordingly, the same determination as the above-described embodiment is performed.

In this modification, steps S16a, S16b, S17a, S18, and S19 of FIG. 9 correspond to the determining means.

Second Embodiment

In the embodiment and modification thereof described above, the time period parameter CRME is converted to the rotational speed OMG, and the misfire determination is performed using the rotational speed OMG as the speed parameter. In this embodiment, the misfire determination is performed using the time period parameter CRME as the speed parameter. It is to be noted that the second embodiment is the same as the first embodiment except for the points described below.

Figure 10:
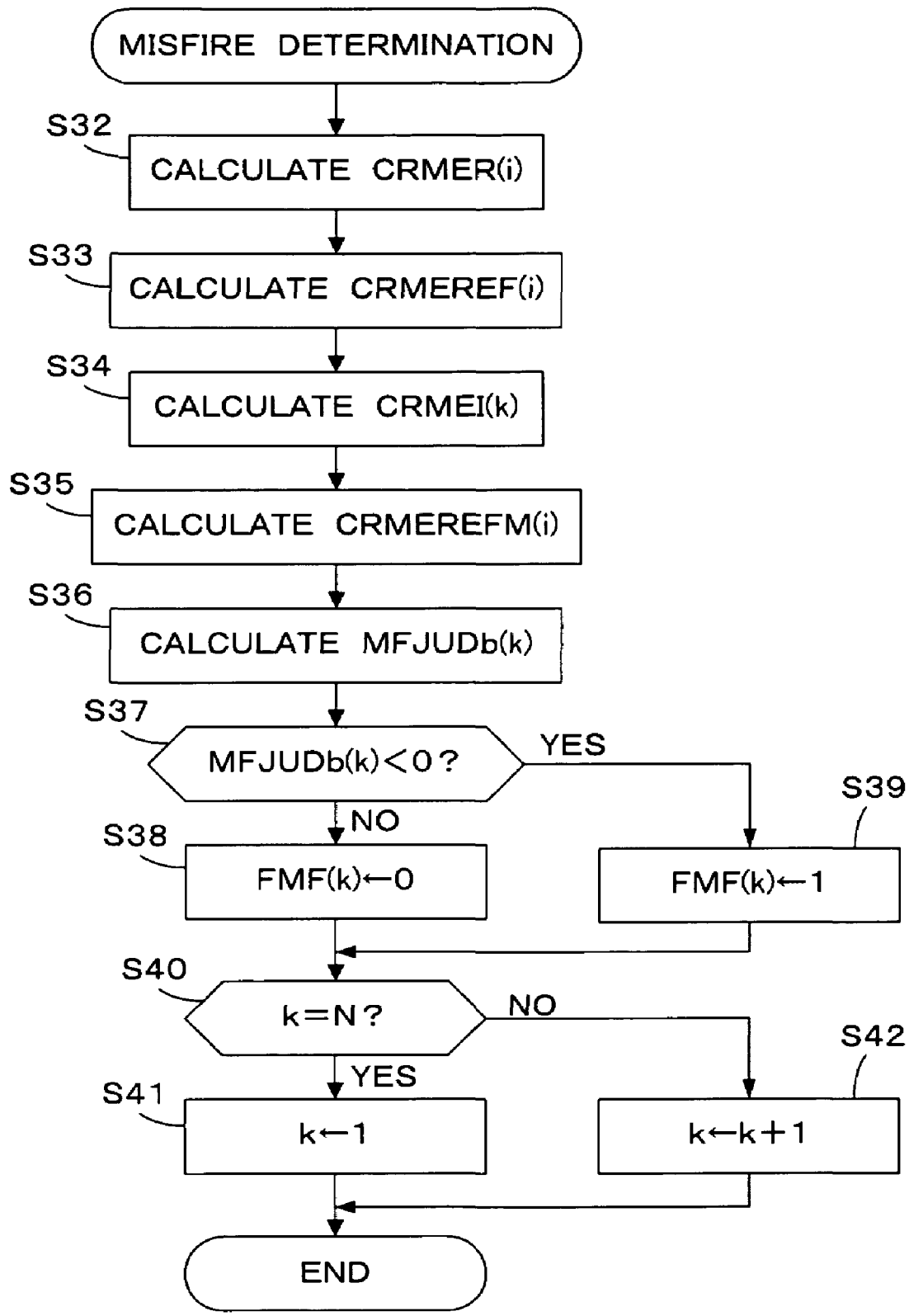
FIG. 10 is a flowchart of a misfire determination process according to a second embodiment of the present invention.

FIG. 10 is a flowchart of the misfire determination process using the time period parameter CRME as the speed parameter.

In step S32, the 720-degree filtering is performed by equation (21) to calculate a filtered time period parameter CRMER(i).

$$CRMER(i)=CRME(i)-(CRME(0)-CRME(ND))\times D\theta\times i/4\pi \qquad (21)$$

In step S33, the relative time period parameter CRMEREF(i) is calculated by equation (22).

$$CRMEREF(i)=CRMER((k-1)NTDC)-CRMER(i) \qquad (22)$$

where CRMER((k−1)NTDC) is a reference time period parameter which corresponds to the filtered time period parameter at the compression TDC of the cylinder being subjected to the determination.

In step S34, an inertial force time period parameter CRMEI(k) is calculated by equation (23).

$$CRMEI(k)=3I\times CRME((k-1)NTDC)/K \qquad (23)$$

In step S35, a modified relative time period parameter CRMEREFM(i) is calculated by equation (24).

$$CRMEREFM(i)=CRMEREF(i)-CRMEI(k) \qquad (24)$$

In step S36, a determination parameter MFJUDb(k) is calculated as an integrated value of the modified relative time period parameter CRMEREFM by equation (25).

$$MFJUDb(k) = \sum_{i=(k-1)NTDC}^{kNTDC-1} CRMEREFM(i) \qquad (25)$$

In step S37, it is determined whether the determination parameter MFJUDb(k) is less than "0". If the answer to step S37 is negative (NO), it is determined that normal combustion is performed and the misfire flag FMF(k) is set to "0" (step S38). On the other hand, if MFJUDb(k) is less than "0", it is determined that a misfire has occurred in cylinder #k, and the misfire flag FMF(k) is set to "1" (step S39).

In step S40, it is determined whether the cylinder discrimination number k is equal to the number N of cylinders. If the answer to step S40 is negative (NO), the cylinder discrimination number k is incremented by "1" (step S42). If the cylinder discrimination number k is equal to the number N of cylinders, the cylinder discrimination number k is returned to "1" (step S41).

As described above with reference to FIG. 2B, the integrated value of the relative time period parameter CRMEREF changes depending on whether the misfire is present, similarly as the integrated value of the relative rotational speed OMGREF. Therefore, the misfire determination is accurately performed with respect to each cylinder as in the first embodiment.

In the second embodiment, step S33 of FIG. 10 corresponds to the reference value calculating means and the relative speed parameter calculating means, steps S36-S39 correspond to the determining means, steps S34 and S35 correspond to the inertial force speed component calculating means, and step S32 corresponds to the load torque correcting means.

Modification

Figure 11:
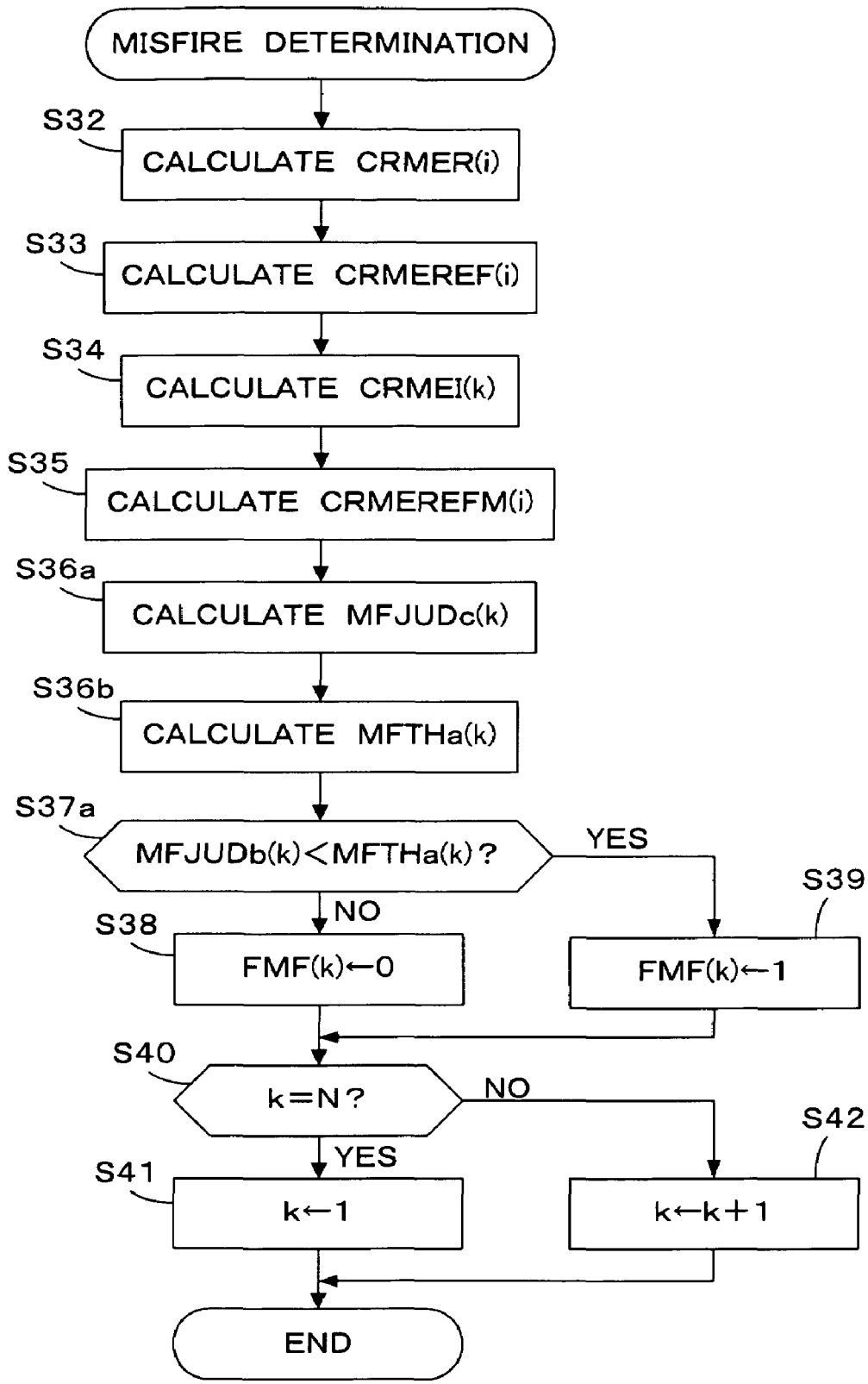
FIG. 11 is a flowchart of a misfire determination process according to a modification of the second embodiment of the present invention.

FIG. 11 shows a modification of the embodiment shown in FIG. 10. The process shown in FIG. 11 is obtained by changing steps S36 and S37 of the process shown in FIG. 10 to steps S36a, S36b, and S37a.

In step S36a, the determination parameter MFJUDc(k) is calculated as an integrated value of the relative time period parameter CRMEREF(i) by equation (25a).

$$MFJUDc(k) = \sum_{i=(k-1)NTDC}^{kNTDC-1} CRMEREF(i) \qquad (25a)$$

In step S36b, a determination threshold value MFTHa(k) is calculated by equation (26).

$$MFTHa(k)=NTDC\times CRMEI(k) \qquad (26)$$

In step S37a, it is determined whether the determination parameter MFJUDc(k) is less than the determination threshold value MFTHa (k). If the answer to step S37a is negative (NO), it is determined that normal combustion is performed and the process proceeds to step S38. On the other hand, if MFJUDc(k) is less than MFTHa (k), it is determined that a misfire has occurred in cylinder #k, and the process proceeds to step S39.

In the modification of the second embodiment, the determination threshold value MFTHa(k) corresponds to the integrated value of the inertial force time period parameter CRMEI. That is, the determination parameter MFJUDc(k) is calculated by integrating the relative time period parameter CRMEREF instead of integrating the modified relative time period parameter CRMEREFM, and the determination threshold value MFTHa(k) is calculated as the integrated value of the inertial force time period parameter CRMEI. Accordingly, the same determination as the above-described second embodiment is performed.

In this modification, steps S36a, S36b, S37a, S38 and S39 of FIG. 11 correspond to the determination means.

Other Modifications

The present invention is not limited to the embodiments and the modifications described above, and various other modifications may be made. For example, in the second embodiment, the time period parameter CRME(i) is applied to equation (8) to calculate the rotational speed OMG. It is preferable to calculate the rotational speed OMG using an integrated value CRME30(i) of five time period parameters CRME calculated by equation (31) in order to prevent the calculation accuracy from becoming lower in a condition of high rotational speed.

$$CRME30(i) = \sum_{j=0}^{4} CRME(i+j) \quad (31)$$

In this case, the rotational speed OMG(i) is calculated by equation (8a). However, the calculation by equation (8a) includes a phase shift of the calculated rotational speed. Therefore, it is necessary to perform a phase correction corresponding to the phase shift.

$OMG(i)=5D\theta/CRME30(i)$ (8a)

Further, in the above-described embodiment, the rotational speed (time period parameter) at the compression TDC of each cylinder is used as the reference rotational speed (reference time period parameter) which is a reference of the relative rotational speed OMGREF (relative time period parameter CRMEREF). However, it is not essential that the sampling timing of the reference speed parameter accurately coincides with the compression TDC. The sampling timing of the reference speed parameter may be within the vicinity of the compression TDC (for example, within the range of the compression TDC±7.5 degrees). The value of "7.5 degrees" corresponds to an example where the sampling period of the rotational speed parameter is 15 degrees. In general, the rotational speed parameter sampled within the range of the compression TDC±θSPL/2 can be used as the reference speed parameter, where θSPL is a sampling period.

Further, with respect to the 720-degrees filtering, equation (9a) is used instead of equation (9). Equation (9a) cancels the linearly changing component using a moving average value OMGAVE(m) of the rotational speed OMG for the period of 720 degrees of the crank angle. In equation (9a), "m" is a discrete time corresponding to the period of 720 degrees of the crank angle.

$OMGR(i)=OMG(i)-(OMGAVE(m)-OMGAVE(m-1))\times$
$D\theta\times i/4\pi$ (9a)

Third Embodiment

In this embodiment, the calculation method of the modified relative rotational speed OMGREFM in the first embodiment is changed to eliminate an influence of disturbances due to torsion of the crankshaft, a detection error of the time period parameter CRME detected by the crank angle position sensor, and the like.

Figure 12A:
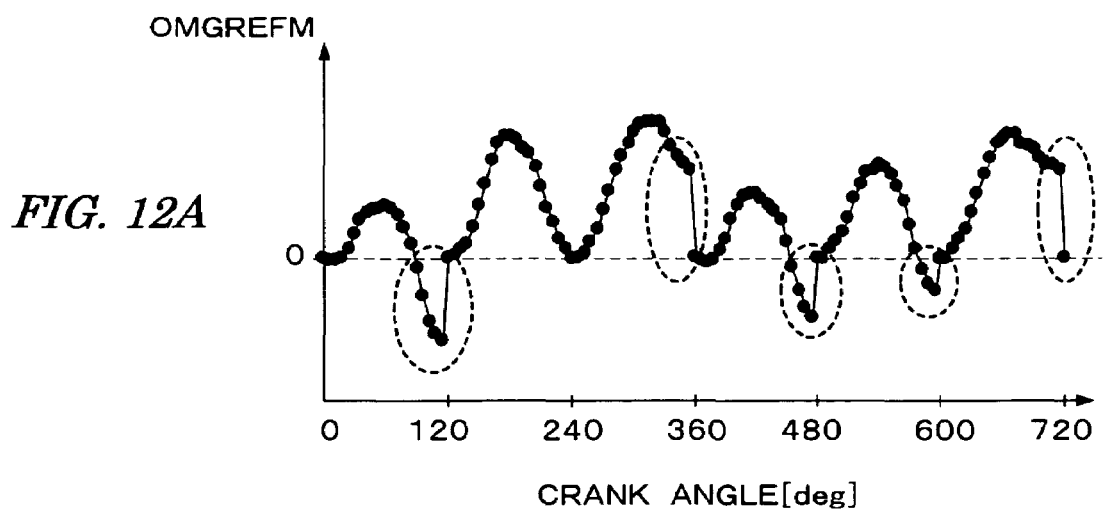
FIGS. 12A and 12B show the influence of disturbances contained in the output of the crank angle position sensor.
Figure 12B:
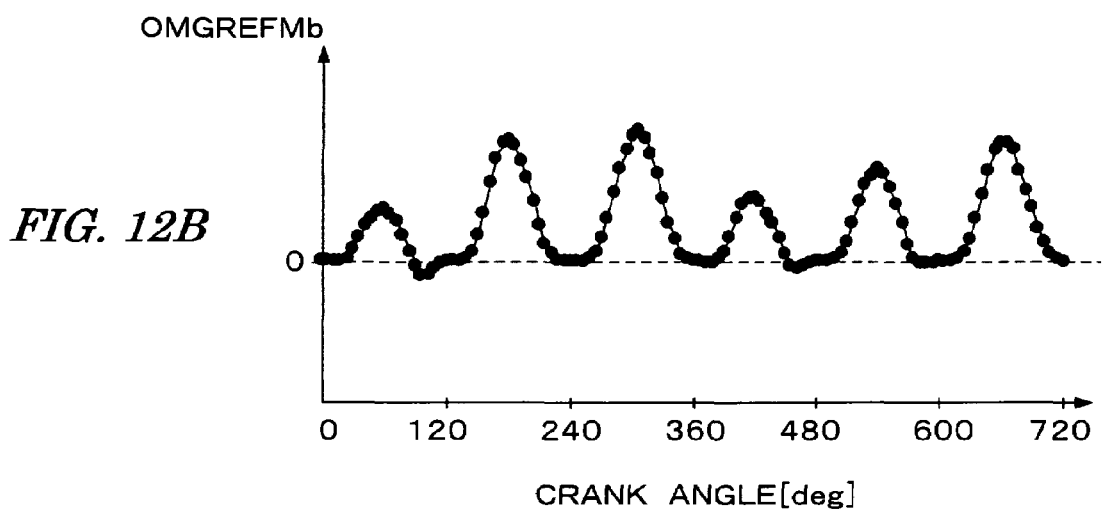

FIG. 12A shows an example of actually measured data of the modified relative rotational speed OMGREFM. In FIG. 12A, the portions surrounded with the dashed lines are influenced by the above-described disturbances. If the influence of such disturbances is present, a possibility of an incorrect determination of misfire increases. Therefore, in this embodiment, the influence of the above-described disturbances is eliminated by multiplying the modified relative rotational speed OMDREFM by a combustion correlation function FCR. The combustion correlation function FCR approximates changes in the rotational speed when normal combustion is performed and there is no disturbance that affects the detected value of the crank angle position sensor. FIG. 12B shows a modified relative rotational speed OMGREFMb calculated by multiplying the modified relative rotational speed OMGREFM shown in FIG. 12A by the combustion correlation function FCR. The waveform corresponding to the portions surrounded with the dashed lines shown in FIG. 12A is improved.

Figure 5:
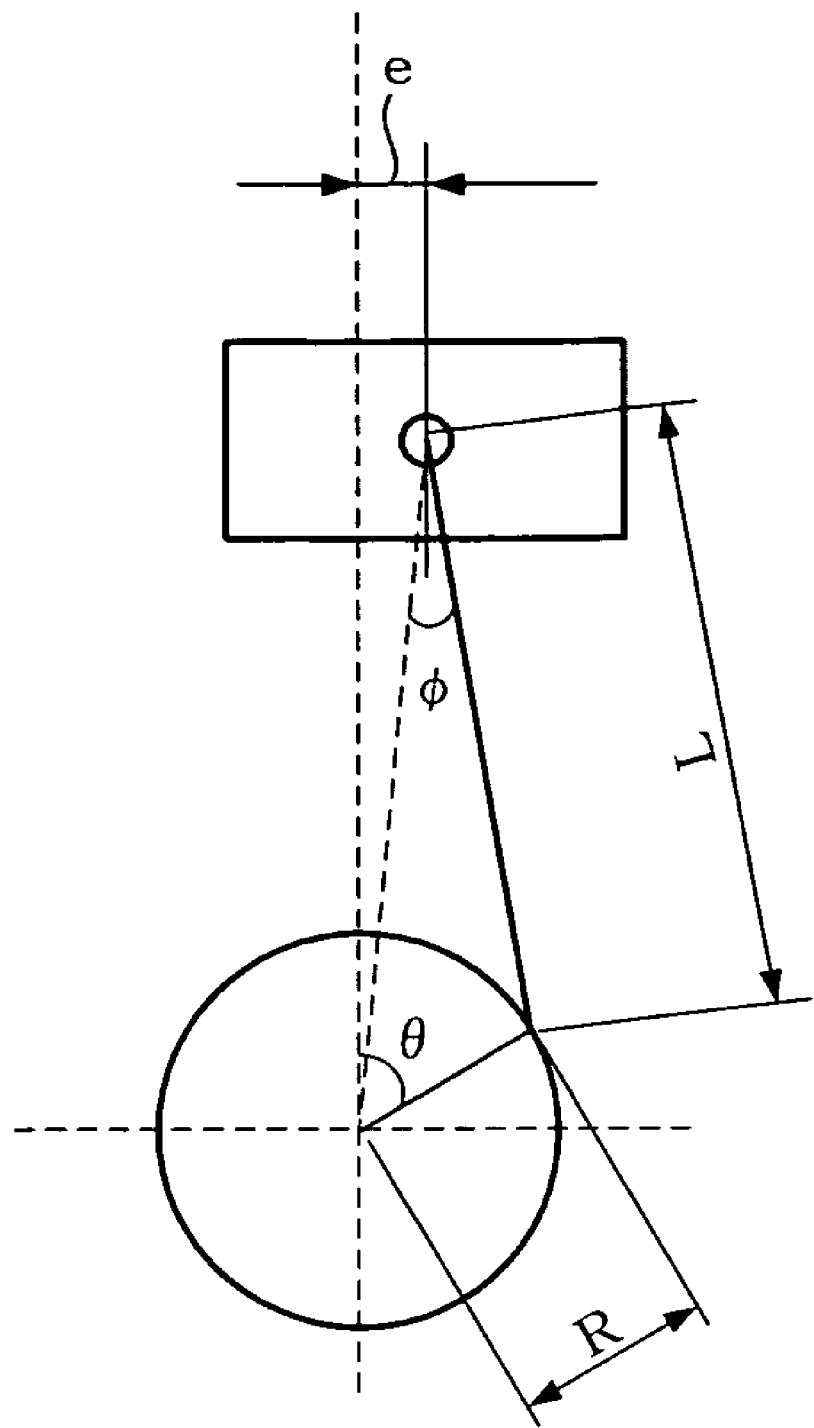
FIG. 5 is a schematic diagram showing a calculation method of the inertial force torque due to operation of reciprocating moving parts of the engine.
Figure 13:
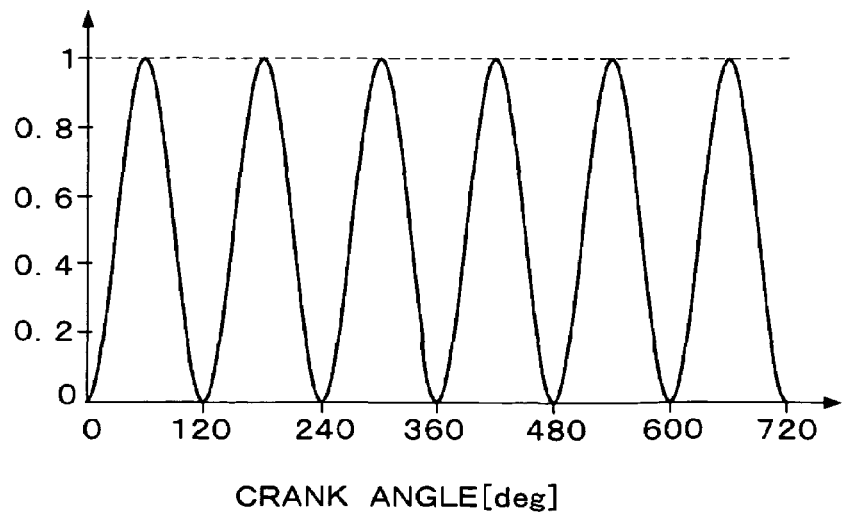
FIG. 13 shows an example of the combustion correlation function (FCR)

As the combustion correlation function FCR, the function shown in FIG. 13, i.e., the function defined by equation (41), is used. In equation (41), "N" is a number of cylinders and "θ" is a crank angle defined on the basis of a crank angle at which a piston in a specific cylinder of the engine is positioned at the TDC (refer to FIG. 5). FIG. 13 shows the combustion correlation function FCR corresponding to the 6-cylinder engine of this embodiment.

$FCR=\{1-\cos(N\cdot\theta/2)\}/2$ (41)

Figure 14:
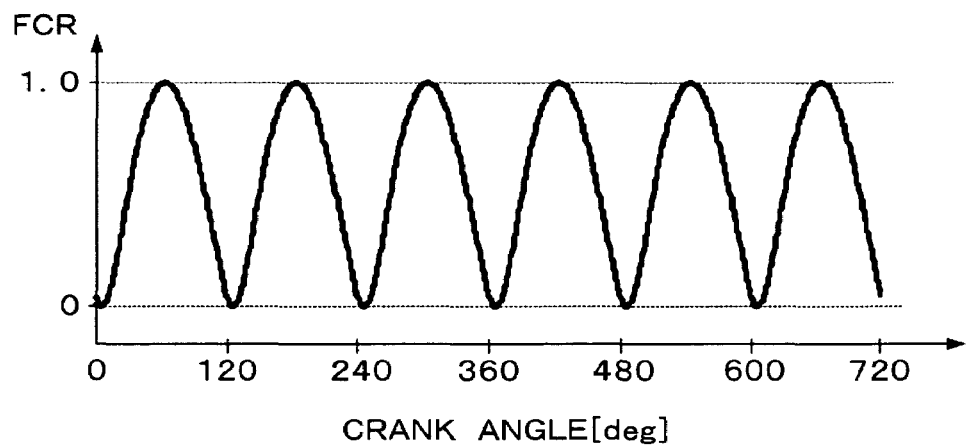
FIG. 14 shows another example of the combustion correlation function (FCR)

Further, the combustion correlation function FCR is obtained by the following steps: measuring a cylinder pressure (a pressure in the combustion chamber) of each cylinder when the engine is operating, for example, in a steady state after warming-up and normal combustion is performed; summing up the measured data of the cylinder pressure in each cylinder to calculate combined changes in the cylinder pressure; and converting the combined changes in the cylinder pressure to changes in the rotational speed of the engine. FIG. 14 shows an example of the combustion correlation function FCR obtained by the above-described steps. The combustion correlation function shown in FIG. 14 is a function which is obtained by normalizing a waveform indicative of the changes in the rotational speed of the engine corresponding to normal combustion so that the minimum value of the waveform is equal to "0" and the maximum value of the waveform is equal to "1".

Figure 15A:
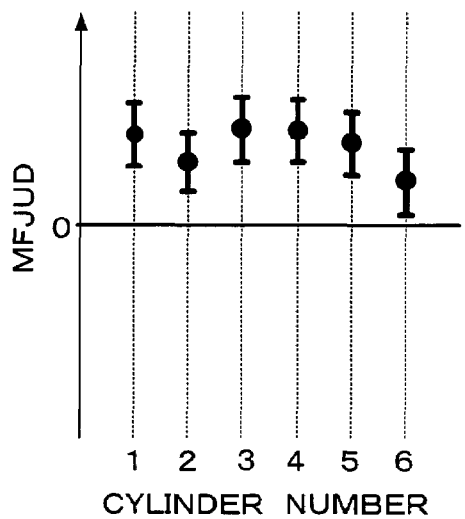
FIGS. 15A and 15B show variations in the measured values of the misfire determination parameter.
Figure 15B:
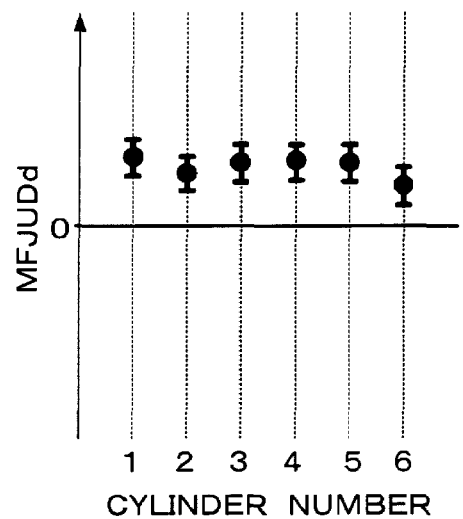

FIG. 15A shows an example of variation ranges in the determination parameter MFJUD (average value (indicated by a round mark)±3σ) when the relative rotational speed is not corrected by the combustion correlation function. FIG. 15B shows an example of variation ranges in the determination parameter MFJUDd calculated in this embodiment. By performing the correction using the combustion correlation function FCR, calculation accuracy of the determination parameter MFJUDd is improved, as clearly seen from these figures, wherein the variation range is narrowed (in the illustrated example, narrowed by about 40%). Consequently, accuracy of the misfire determination is improved.

Figure 16:
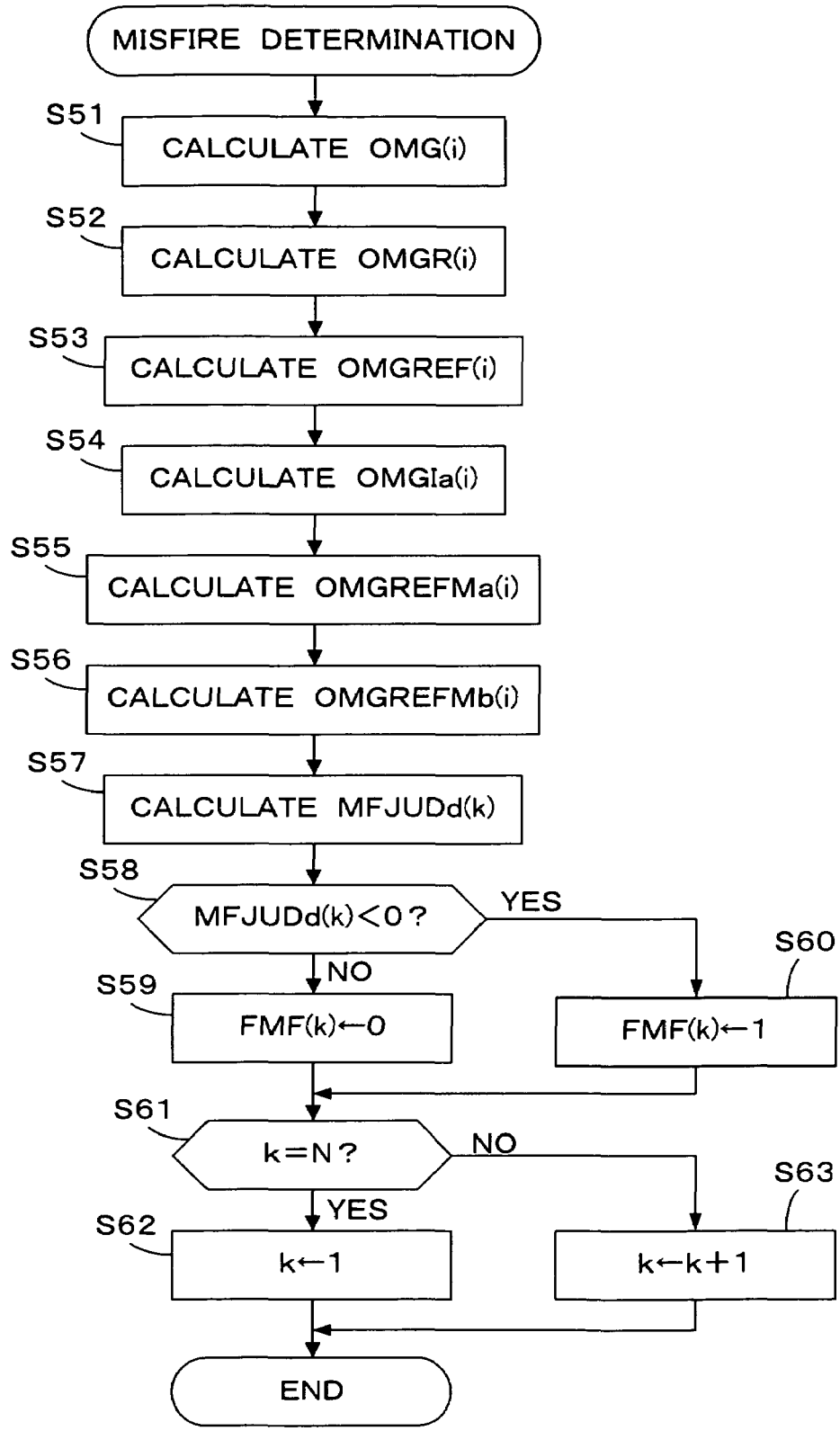
FIG. 16 is a flowchart of a misfire determination process according to a third embodiment of the present invention.

FIG. 16 is a flowchart of the misfire determination process of the third embodiment. In FIG. 16, steps S51-S53 are the same as steps S11-S13 of FIG. 7, and steps S59-S63 are the same as steps S18-S22 of FIG. 7.

In step S54, the inertial force rotational speed OMGI (k) calculated by the equation (11) is applied to equation (42) to calculate an inertial force rotational speed OMGIa(i). In the first embodiment, the modified relative rotational speed OMGREFM(i) is calculated by applying the inertial force rotational speed OMGI(k) at the compression TDC to equation (12). In this embodiment, the inertial force rotational speed OMGIa(i) at each sample timing is calculated, and the relative rotational speed OMGREF is modified with the inertial force rotational speed OMGIa(i). In equation (42), the inertial force rotational speed OMGI(k−3), which is an inertial force rotational speed at the sampling timing of 3TDC periods before, is applied. This is because calculation accuracy becomes higher when using the inertial force rotational speed OMGI(k−3) which corresponds to a value at the center of the filtering range of the above-described 720-degree filtering. Since the parameter k is a cylinder discrimination number, k=0, −1, and −2 correspond respectively to k=N (=6), N−1 (=5), and N−2 (=4).

$$OMGIa(i)=OMGI(k-3)\times\{\cos(N\cdot D\theta\cdot i/2)-1\} \quad (42)$$

In step S55, the inertial force rotational speed OMGIa(i), calculated in step S54, is applied to equation (43) to calculate a first modified relative rotational speed OMGREFMa(i).

$$OMGREFMa(i)=OMGREF(i)-OMGIa(i) \quad (43)$$

In step S56, the first modified relative rotational speed OMGREFMa(i) calculated in step S55 and the combustion correlation function FCR (i) calculated by equation (44) are applied to equation (45), to calculate a second modified relative rotational speed OMGREFMb(i). Equation (44) is obtained by replacing "θ" in equation (41) with (Dθ·i).

$$FCR(i)=\{1-2\cos(N\cdot D\theta\cdot i/2)\}/2 \quad (44)$$

$$OMGREFMb(i)=OMGREFMa(i)\times FCR(i) \quad (45)$$

In step S57, the determination parameter MFJUDd (k) is calculated by equation (46).

$$MFJUDd(k) = \sum_{i=(k-1)NTDC}^{kNTDC-1} OMGREFMb(i) \quad (46)$$

In step S58, it is determined whether the determination parameter MFJUDd (k) is a negative value. If the answer to step S58 is affirmative (YES), it is determined that a misfire has occurred and the process proceeds to step S60. On the other hand, if MFJUDd(k) is greater than or equal to "0", the process proceeds to step S59.

As described above, in the present embodiment, the first modified relative rotational speed OMGREFMa is calculated by subtracting the inertial force rotational speed OMGIa(i) from the relative rotational speed OMGREF(i). The second modified relative rotational speed OMGREFMb is calculated by multiplying the first modified relative rotational speed OMGREFMa by the combustion correlation function FCR. The determination parameter MFJUDd is calculated by integrating the second modified relative rotational speed OMGREFMb. Therefore, the influence of disturbances, which affect values detected by the crank angle position sensor 12, is eliminated, and accuracy of the misfire determination is improved.

By using the combustion correlation function FCR (i) of equation (44), experiments for setting a table for calculating a value of the combustion correlation function become unnecessary, and correction is appropriately performed regardless of the number of cylinders using a relatively simple calculation.

In this embodiment, step S51 of FIG. 16 corresponds to a part of the rotational speed parameter detecting means, step S53 corresponds to the reference value calculating means and the relative speed parameter calculating means, steps S55-S60 correspond to the determination means, step S54 corresponds to the inertial force speed component calculating means, and step S52 corresponds to the load torque correcting means.

Modification

When using the combustion correlation function based on the actually measured data shown in FIG. 14, an FCR table, which is retrieved according to the parameter "i" for calculating values corresponding to one period of the function FCR, is previously stored in the memory, and the FCR table is retrieved in step S56 instead of performing the calculation of equation (44). By using the combustion correlation function based on the actually measured data, the characteristic of the engine is reflected in the combustion correlation function, thereby performing the correction more appropriately.

Instead of performing the calculation of equation (44), a cosine function table may previously be stored in the memory and a value of the combustion correlation function value FCR(i) may be calculated by retrieving the cosine function table.

Further, the inertial force rotational speed OMGI(k−3) in equation (42) may be replaced with the present value OMGI (k) of the inertial force rotational speed.

Further, the correction using the combustion correlation function FCR is applicable also to the second embodiment described above.

Further, in the above-described embodiment, an example where the present invention is applied to a six-cylinder engine is shown. The present invention can be applied regardless of the number of cylinders. Further, the present invention can be applied also to the misfire determination for a gasoline engine in which fuel is directly injected into a combustion chamber, or a diesel engine. Further, the present invention can be applied also to the misfire determination of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A misfire detecting apparatus for an internal combustion engine having rotational speed parameter detecting means for detecting a rotational speed parameter according to a rotational speed of said engine, and detecting a misfire of said engine based on the detected rotational speed parameter, said misfire detecting apparatus comprising:

reference value calculating means for calculating a reference value of the rotational speed parameter;

relative speed parameter calculating means for calculating a difference between the reference value and the rotational speed parameter detected at every predetermined crank angle as a relative speed parameter; and determining means for calculating an integrated value of the relative speed parameter, and performing a misfire determination based on the calculated integrated value, said determining means integrates the relative speed parameter for a period corresponding to 720/N degrees of a crank angle, where "N" is a number of cylinders of said engine.

2. A misfire detecting apparatus according to claim 1, wherein the reference value is set to the rotational speed parameter detected when a piston of a cylinder of said engine is proximate a top dead center from which a combustion stroke starts, said cylinder being subjected to the misfire determination.

3. A misfire detecting apparatus according to claim 1, further including inertial force speed component calculating means for calculating an inertial force rotational speed component due to an inertial force of moving parts of said engine, wherein said determining means performs the misfire determination based on the relative speed parameter and the inertial force rotational speed component.

4. A misfire detecting apparatus according to claim 1, further including load torque correcting means for correcting the rotational speed parameter to eliminate a rotational speed changing component due to a load torque applied to said engine from a load on said engine, wherein said reference value calculating means and relative speed parameter calculating means, respectively, calculate the reference value and the relative rotational speed parameter using the rotational speed parameter corrected by said load torque correcting means.

5. A misfire detecting apparatus according to claim 1, further including inertial force speed component calculating means for calculating an inertial force rotational speed component due to an inertial force of moving parts of said engine, wherein said determining means modifies the relative speed parameter with the inertial force rotational speed component to calculate a first modified relative speed parameter, multiplies the first modified relative parameter by a combustion correlation function which approximates changes in the rotational speed of said engine corresponding to a normal combustion to calculate a second modified relative speed parameter, and performs the misfire determination based on an integrated value of the second modified relative speed parameter.

6. A misfire detecting apparatus according to claim 5, wherein the combustion correlation function is defined by the following equation:

$$(1-\cos(N\cdot\theta/2))/2$$

where "N" is a number of cylinders of said engine, and "θ" is a crank angle defined by the crank angle at which a piston in a specific cylinder of said engine is positioned at the top dead center.

7. A misfire detecting apparatus according to claim 5, wherein the combustion correlation function is defined by normalizing a waveform indicative of changes in the rotational speed of said engine corresponding to normal combustion, wherein a minimum value of the waveform is equal to "0" and a maximum value of the waveform is equal to "1".

8. A misfire detecting method for an internal combustion engine, comprising the steps of:
   a) detecting a rotational speed parameter according to a rotational speed of said engine;
   b) calculating a reference value of the rotational speed parameter;
   c) calculating a difference between the reference value and the rotational speed parameter detected at every predetermined crank angle as a relative speed parameter;
   d) calculating an integrated value of the relative speed parameter, wherein the relative speed parameter is integrated for a period corresponding to 720/N degrees of a crank angle, where "N" is a number of cylinders of said engine; and
   e) performing a misfire determination based on the calculated integrated value.

9. A misfire detecting method according to claim 8, wherein the reference value is set to the rotational speed parameter detected when a piston of a cylinder of said engine is proximate a top dead center from which a combustion stroke starts, said cylinder being subjected to the misfire determination.

10. A misfire detecting method according to claim 8, further including the step of calculating an inertial force rotational speed component due to an inertial force of moving parts of said engine, wherein the misfire determination is performed based on the relative speed parameter and the inertial force rotational speed component.

11. A misfire detecting method according to claim 8, further including the step of correcting the rotational speed parameter to eliminate a rotational speed changing component due to a load torque applied to said engine from a load on said engine, wherein the reference value and the relative rotational speed parameter are respectively calculated using the corrected rotational speed parameter.

12. A misfire detecting method according to claim 8, further including the step of calculating an inertial force rotational speed component due to an inertial force of moving parts of said engine, wherein the step d) includes the steps of:
   i) modifying the relative speed parameter with the inertial force rotational speed component to calculate a first modified relative speed parameter; and
   ii) multiplying the first modified relative speed parameter by a combustion correlation function which approximates changes in the rotational speed of said engine corresponding to a normal combustion, to calculate a second modified relative speed parameter,
   wherein the misfire determination is performed based on an integrated value of the second modified relative speed parameter.

13. A misfire detecting method according to claim 12, wherein the combustion correlation function is defined by the following equation:

$$(1-\cos(N\cdot\theta/2))/2$$

where "N" is a number of cylinders of said engine, and "74" is a crank angle defined by the crank angle at which a piston in a specific cylinder of said engine is positioned at the top dead center.

14. A misfire detecting method according to claim 12, wherein the combustion correlation function is defined by normalizing a waveform indicative of changes in the rotational speed of said engine corresponding to a normal combustion wherein a minimum value of the waveform is equal to "0" and a maximum value of the waveform is equal to "1".

15. A computer program embodied on a computer-readable medium, for causing a computer to implement a misfire detecting method for an internal combustion engine, comprising the steps of:
   a) detecting a rotational speed parameter according to a rotational speed of said engine
   b) calculating a reference value of the rotational speed parameter;
   c) calculating a difference between the reference value and the rotational speed parameter detected at every predetermined crank angle as a relative speed parameter;
   d) calculating an integrated value of the relative speed parameter, wherein the relative speed parameter is integrated for a period corresponding to 720/N degrees of a crank angle, where "N" is a number of cylinders of said engine; and
   e) performing a misfire determination based on the calculated integrated value.

16. A computer program according to claim 15, wherein the reference value is set to a rotational speed parameter detected when a piston of a cylinder of said engine is proximate a top dead center from which a combustion stroke starts, said cylinder being subjected to the misfire determination.

17. A computer program according to claim 15, wherein the misfire detecting method further includes the step of calculating an inertial force rotational speed component due to an inertial force of moving parts of said engine, and the misfire determination is performed based on the relative speed parameter and the inertial force rotational speed component.

18. A computer program according to claim 15, wherein the misfire detecting method further includes the step of correcting the rotational speed parameter to eliminate a rotational speed changing component due to a load torque applied to said engine from a load on said engine, and the reference value and the relative rotational speed parameter are respectively calculated using the corrected rotational speed parameter.

19. A computer program according to claim 15, wherein the misfire detecting method further includes the step of calculating an inertial force rotational speed component due to an inertial force of moving parts of said engine, and the step d) includes the steps of:
  i) modifying the relative speed parameter with the inertial force rotational speed component to calculate a first modified relative speed parameter; and
  ii) multiplying the first modified relative speed parameter by a combustion correlation function which approximates changes in the rotational speed of said engine corresponding to a normal combustion to calculate a second modified relative speed parameter,
  wherein the misfire determination is performed based on an integrated value of the second modified relative speed parameter.

20. A computer program according to claim 19, wherein the combustion correlation function is defined by the following equation:

$$(1-\cos(N\cdot\theta/2))/2$$

where "N" is a number of cylinders of said engine, and "$\theta$" is a crank angle defined on the basis of a crank angle at which a piston in a specific cylinder of said engine is positioned at the top dead center.

21. A computer program according to claim 19, wherein the combustion correlation function is defined by normalizing a waveform indicative of changes in the rotational speed of said engine corresponding to normal combustion wherein a minimum value of the waveform is equal to "0" and a maximum value of the waveform is equal to "1".

* * * * *